(12) United States Patent
Buczek et al.

(10) Patent No.: US 9,516,890 B2
(45) Date of Patent: Dec. 13, 2016

(54) RIB MAZE THAT PREVENTS FLOW ALONG A WALL

(71) Applicants: DENSO International America, Inc., Southfield, MI (US); DENSO CORPORATION, Kariya, Aichi-pref. (JP)

(72) Inventors: Melissa Buczek, Orion, MI (US); Jie Zeng, Windsor (CA); Simon Hotte, Windsor (CA); Eric Barbier, Southfield, MI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 660 days.

(21) Appl. No.: 13/826,715

(22) Filed: Mar. 14, 2013

(65) Prior Publication Data

US 2014/0262141 A1    Sep. 18, 2014

(51) Int. Cl.
 *B60H 1/00* (2006.01)
 *A23G 9/32* (2006.01)
 *C12G 3/04* (2006.01)

(52) U.S. Cl.
 CPC ........... *A23G 9/325* (2013.01); *B60H 1/00021* (2013.01); *C12G 3/04* (2013.01); *A23V 2002/00* (2013.01); *B60H 2001/00092* (2013.01)

(58) Field of Classification Search
 CPC ............... B60H 1/00021; B60H 2001/00092; B60H 1/00064; B60H 1/00071; B60H 1/3414; B60H 2001/00107; F28F 13/12
 USPC .......................................................... 165/42
 See application file for complete search history.

(56) References Cited

U.S. PATENT DOCUMENTS

| 5,489,186 | A | 2/1996 | Yapp et al. |
| 7,369,664 | B2 | 5/2008 | Kargus, IV et al. |
| 7,407,001 | B2 * | 8/2008 | Newman ............ B60H 1/00028 165/202 |
| 8,220,270 | B2 | 7/2012 | Bathina et al. |

FOREIGN PATENT DOCUMENTS

| JP | 2001-315521 | 11/2001 |
| JP | 2006-001378 | 1/2006 |
| JP | 2006-306292 | 11/2006 |

* cited by examiner

*Primary Examiner* — Marc Norman
*Assistant Examiner* — Jon T Schermerhorn
(74) *Attorney, Agent, or Firm* — Harness, Dickey & Pierce, P.L.C.

(57) ABSTRACT

An airflow deflector including a plurality of spaced apart ribs each extending in a longitudinal direction between a first end and a second end thereof that is generally perpendicular to an airflow stream to be deflected by the airflow deflector such that the plurality of spaced apart ribs induce recirculations of the airflow stream between neighboring ones of the plurality of spaced apart ribs to increase air pressure at an entrance to areas defined between neighboring ribs and restrict the airflow from flowing past the plurality of spaced apart ribs.

16 Claims, 2 Drawing Sheets

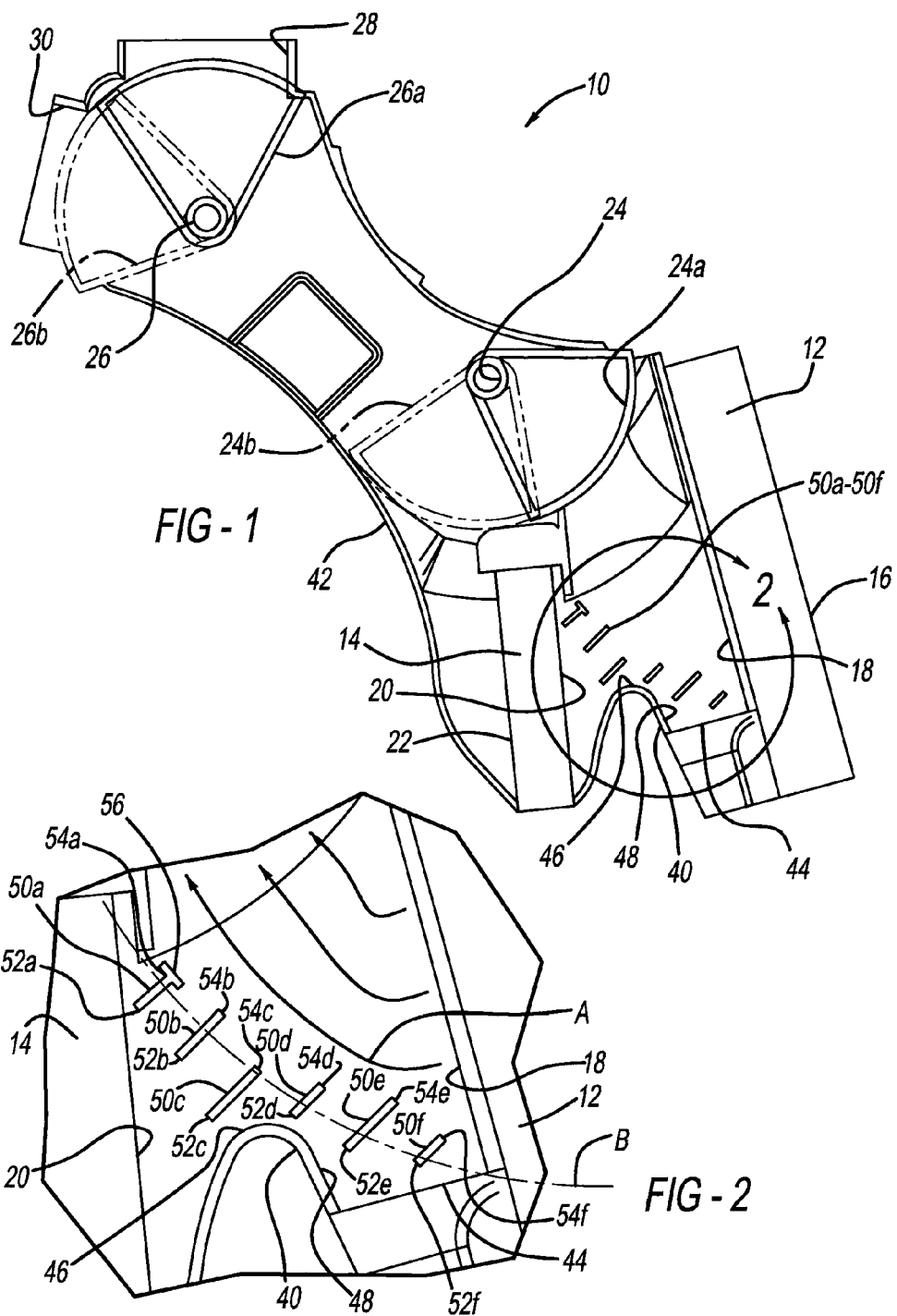

RIB MAZE THAT PREVENTS FLOW ALONG A WALL

FIELD

The present disclosure relates to vehicle heating, ventilation, and air cooling systems, and particularly to a rib maze that prevents airflow along a wall.

BACKGROUND

This section provides background information related to the present disclosure, which is not necessarily prior art.

Motor vehicle heating, ventilation, and air cooling (HVAC) systems typically include an HVAC casing with an evaporator and a heater core housed therein. In a heating mode, airflow that has passed into the HVAC casing through the evaporator, which is often deactivated, is directed through the heater core by a temperature mixing door arranged in parallel to the heater core. In a cooling mode, the evaporator is activated and the control door is positioned such that cooled airflow that has passed through the evaporator is directed away from the heater core. A secondary temperature mixing door may be placed between the evaporator and the heater core so that in the cooling mode a positive airflow seal prevents airflow from entering the heater core chamber and becoming heated. To reduce costs, simplify operation, and increase operational reliance of the HVAC system, it would be desirable to eliminate the control door between the evaporator and the heater core.

SUMMARY

This section provides a general summary of the disclosure, and is not a comprehensive disclosure of its full scope or all of its features.

The present teachings provide for an airflow deflector including a plurality of spaced apart ribs each extending in a longitudinal direction between a first end and a second end thereof that is generally perpendicular to an airflow stream to be deflected by the airflow deflector such that the plurality of spaced apart ribs induce recirculations of the airflow stream between neighboring ones of the plurality of spaced apart ribs to increase air pressure at an entrance to areas defined between neighboring ribs and restrict the airflow from flowing past the plurality of spaced apart ribs.

The present teachings further provide for an HVAC system for a motor vehicle including an evaporator, a heater, and a plurality of spaced-apart deflector ribs that are between the evaporator and the heater. The deflector ribs are configured to direct airflow away from the heater.

The present teachings also provide for an HVAC system for a motor vehicle including an evaporator, a heater, and a plurality of spaced-apart deflector ribs. The deflector ribs are between the evaporator and the heater, and extend in a direction generally perpendicular to airflow to be deflected.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of an HVAC system according to the present teachings;

FIG. 2 is a close-up view of area 2 of FIG. 1;

Corresponding reference numerals indicate corresponding parts throughout the several views of the drawings.

DETAILED DESCRIPTION

Figure 3:
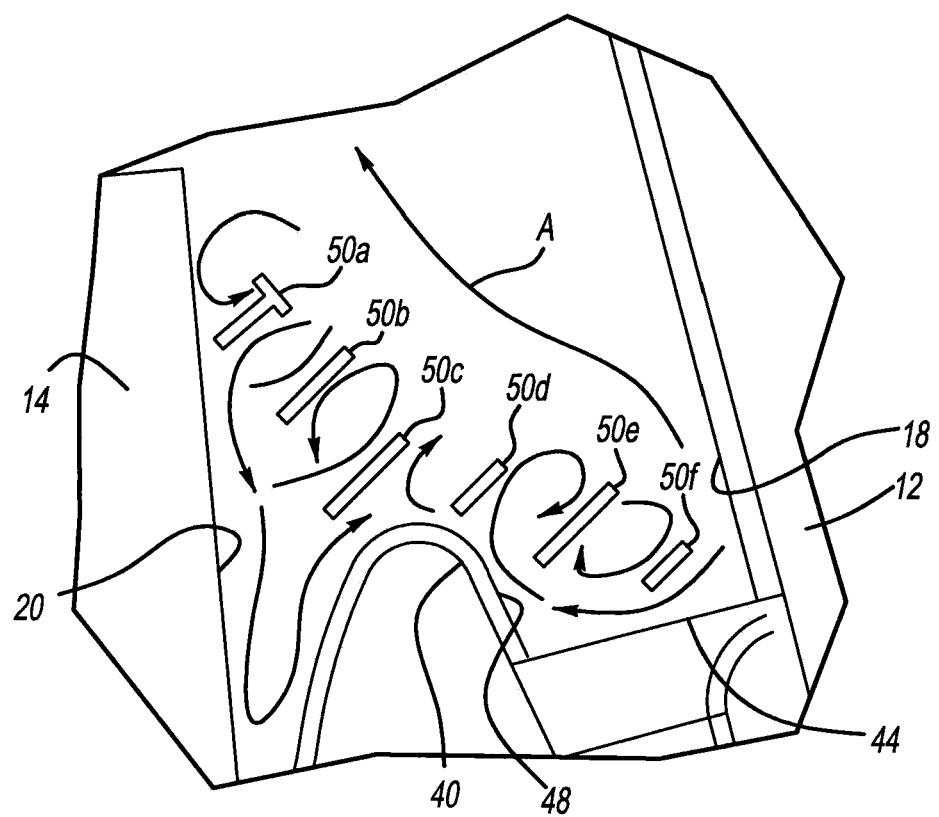
FIG. 3 illustrates airflow through the HVAC system of FIG. 1.

Example embodiments will now be described more fully with reference to the accompanying drawings.

With initial reference to FIG. 1, a heating, ventilation, and air cooling (HVAC) system is illustrated at reference numeral 10. The HVAC system 10 includes an evaporator 12 and a heater core 14. The evaporator 12 includes a first side 16 and a second side 18, which is opposite to the first side 16. The heater core 14 includes a first side 20 and a second side 22, which is opposite to the first side 20. The second side 18 of the evaporator 12 faces the first side 20 of the heater core 14.

The HVAC system 10 further includes a first door or air mix door 24, a second door 26, a face outlet 28, and a foot outlet 30. The first and second doors 24 and 26 are illustrated as rotary doors, but can be any suitable type of door to direct and/or restrict airflow. With respect to the direction of airflow through the evaporator 12, the first door 24 succeeds the evaporator 12 and is in parallel to the heater core 14. The second door 26 is proximate to the face outlet 28 and the foot outlet 30.

The first door 24 is movable between a first position 24a and a second position 24b. In the first position, which is illustrated in FIG. 1, the first door 24 extends generally between the evaporator 12 and the heater core 14 to force airflow to pass through the heater core before exiting to the face and foot outlets 28 and 30. In the second position, the first door 24 blocks airflow from the heater core 14 allowing it to go directly to the face and foot outlets 28 and 30.

The second door 26 is also movable between a first position 26a and a second position 26b. FIG. 1 illustrates the second door 26 in the first position 26a to block airflow to the face outlet 28, thereby permitting airflow through the foot outlet 30. In the second position 26b, the second door 26 is arranged to block airflow to the foot outlet 30, thereby permitting airflow through the face outlet 28.

Between the evaporator 12 and the heater core 14 is a diverter 40, which is generally a raised surface of HVAC housing or case 42 at a base 44 thereof. With continued reference to FIG. 1 and additional reference to FIG. 2, the diverter 40 includes a diverter apex 46 and a diverter face 48, which extends between the diverter apex 46 and the base 44. The diverter face 48 generally faces the second side 18 of the evaporator 12.

Also between the evaporator 12 and the heater core 14 are a plurality of deflectors 50a-50f, which generally take the form of deflector ribs. As illustrated, six deflector ribs 50a-50f are included. Any suitable number of deflector ribs 50a-50f can be included, however. Each deflector rib 50a-50f generally includes an elongated portion with a first end 52a-52f and a second end 54a-54f that is opposite to the first end 52a-52f. One or more of the deflector ribs 50a-50f can include a transverse portion 56, such as at the second end 54a-54f. The transverse portion 56 extends generally transverse or perpendicular to the rest of the deflector rib 50a-50f that the transverse portion 56 is associated with. As illustrated, deflector rib 50a includes the transverse portion 56 at the second end 54a. Such a transverse portion 56 can be provided at any location where the longitudinal portion of the ribs 50a-50f between the first end 52a-52f and the second end 54a-54f is not entirely sufficient to deflect airflow.

The deflector ribs 50a-50f can be arranged in any suitable manner. For example, the deflector ribs 50a-50f can be arranged such that they extend lengthwise between the first end 52a-52f and the second end 54a-54f in a direction generally perpendicular to a main airflow stream A, as illustrated in FIG. 2 for example. The deflector ribs 50a-50f can be arranged in any suitable orientation relative to one another in order to extend generally perpendicular to the main airflow stream A, such as along a curved line B, which is illustrated in FIG. 2 and extends between the heater core 14 and the evaporator 12. First deflector rib 50a is arranged closest to the heater core 14, furthest from the evaporator 12, and furthest from the base 44 of the HVAC case 42. Sixth deflector rib 50f is arranged furthest from the heater core 14, closest to the evaporator 12, and closest to the base 44. The deflector ribs 50a-50f can have varying lengths. For example, the fourth deflector rib 50d can be shorter than the neighboring third and fifth deflector ribs 50c and 50e. The deflector ribs 50a-50f are generally arranged staggered or offset with respect to each other along the curved line B. For example, the third deflector rib 50c can be further offset from the line B than the second or fourth deflector ribs 50b and 50d.

Operation of the HVAC system 10 in a maximum heat mode will now be described. Airflow is directed through the evaporator 12, which can be deactivated. Airflow enters the evaporator 12 at the first side 16, and exits the evaporator 12 at the second side 18. In the maximum heat mode, the first door 24 is arranged in the first position 24a illustrated in FIG. 1, such that all airflow passing through the evaporator 12 is directed to the heater core 14. With the first door 24 in the first position 24a of FIG. 1, the pressure between the evaporator 12 and the heater core 14 drops, thereby further forcing airflow from the evaporator to the heater core 14. The deflector ribs 50a-50f are orientated such that they extend generally parallel to the direction of airflow to the heater core 14 when the first door 24 is at the first position 24a of FIG. 1, thereby permitting airflow to pass to and through the heater core 14 to heat the airflow, with only a small restriction.

In a cooling mode, the evaporator 12 is activated and the first door 24 is rotated to the second position 24b, in which airflow is free to flow directly from the evaporator 12 to the face and foot outlets 28 and 30 without passing through the heater core 14. The diverter 40 will direct airflow from the evaporator 12 away from the heater core 14 and towards the face and foot outlets 28 and 30. Furthermore, air pressure between the evaporator 12 and the heater core 14 will be less than that at and behind the heater core 14, thereby forcing airflow away from the heater core 14 and towards the face and foot outlets 28 and 30. To prevent the airflow from being warmed by the heater core 14, it is desirable to keep the airflow, such as airflow A of FIG. 2, as far away from the heater core 14 as possible. The deflector ribs 50a-50f direct airflow A away from the heater core 14 due to their arrangement and orientation.

The staggered arrangement of the deflector ribs 50a-50f and the general arrangement of the deflector ribs 50a-50f perpendicular to the main airflow stream A creates a series of small channels therebetween that induce small air recirculations, as illustrated in FIG. 3, between the ribs 50a-50f as airflow A moves along the deflector ribs 50a-50f. The recirculations increase the pressure at the second ends 54a-54f of the ribs 50a-50f, which substantially reduces the amount of airflow to the heater 14. As a result, the airflow A is forced away from the heater core 14, thereby preventing the airflow A from being warmed by the heater core 14 when the HVAC system 10 is in a cooling mode.

Although the deflector ribs 50a-50f are described as being used with the HVAC system 10, the ribs 50a-50f can be provided at any suitable location and can be used with any suitable device, process, machine, manufacture, or composition to direct airflow away from a surface. The position and orientation of the ribs 50a-50f can be customized according to the particular application. For example, any suitable number of the ribs 50a-50f can be provided with any suitable spacing, length, and orientation such that the ribs 50a-50f extend generally perpendicular to an airflow to create a series of small channels along the airflow stream that induce small airflow recirculations between neighboring ribs 50a-50f. The airflow recirculations increase the pressure at the entrances of the channels (such as at the second ends 54a-54f of the ribs 50a-50f), which reduces airflow past or through the channels. Any one or more of the ribs 50a-50f can be provided with the transverse portion 56 at any location where the longitudinal portion of the ribs 50a-50f between the first end 52a-52f and the second end 54a-54f is not entirely sufficient to deflect airflow The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airflow deflector comprising:
a plurality of spaced apart ribs each extending in a longitudinal direction between a first end and a second end thereof that is generally perpendicular to an airflow stream to be deflected by the airflow deflector such that the plurality of spaced apart ribs induce recirculations of the airflow stream between neighboring ones of the plurality of spaced apart ribs to increase air pressure at an entrance to areas defined between neighboring ribs and restrict the airflow from flowing past the plurality of spaced apart ribs;
wherein a first one of the plurality of spaced apart ribs includes a transverse portion extending transverse to the longitudinal direction; and
wherein the plurality of ribs are included with an HVAC system, the first one of the plurality of ribs is furthest from a base of the HVAC system.

2. The airflow deflector of claim 1, wherein the plurality of ribs are mounted to an HVAC housing.

3. The airflow deflector of claim 1, wherein the plurality of ribs are staggered with respect to each other.

4. The airflow deflector of claim 1, wherein the plurality of ribs are arranged generally along a curved line.

5. The airflow deflector of claim 1, wherein the first end of each one of the plurality of ribs is closest to a heater of the HVAC system and the second end of each one of the plurality of ribs is closest to an evaporator of the HVAC system.

6. The airflow deflector of claim 1, wherein neighboring ribs of the plurality of ribs have different lengths.

7. The airflow deflector of claim 1, wherein the plurality of ribs extend generally parallel to airflow exiting an evaporator when the HVAC system housing the plurality of ribs is in a maximum heat mode, thereby permitting airflow past the ribs and through a heater during maximum heat mode.

8. The airflow deflector of claim 1, wherein the plurality of ribs are arranged between an evaporator and a heater core.

9. An HVAC system for a motor vehicle comprising:
an evaporator;
a heater; and
a plurality of spaced-apart deflector ribs between the evaporator and the heater, the deflector ribs configured to direct airflow away from the heater;
wherein a first deflector rib of the plurality of deflector ribs includes a first portion and a second portion that is transverse to the first portion;
wherein the first deflector rib is furthest from a base of the HVAC system; and
wherein the first deflector rib is closest to the heater.

10. The HVAC system of claim 9, wherein the deflector ribs are mounted to an HVAC housing.

11. The HVAC system of claim 9, wherein the deflector ribs are staggered with respect to one another and extend in a direction generally perpendicular to airflow to be deflected.

12. The HVAC system of claim 9, wherein each one of the deflector ribs is elongated and includes a first end proximate to the heater and a second end proximate to the evaporator, the first end is opposite to the second end.

13. The HVAC system of claim 9, wherein the plurality of deflector ribs includes the first deflector rib and a second deflector rib, of the plurality of deflector ribs the first deflector rib is closest to the heater and furthest from the evaporator, and the second deflector rib is closest to the evaporator and furthest from the heater.

14. The HVAC system of claim 9, wherein neighboring ones of the plurality of deflector ribs have different lengths.

15. An HVAC system for a motor vehicle comprising:
an evaporator;
a heater; and
a plurality of spaced-apart deflector ribs between the evaporator and the heater that extend in a direction generally perpendicular to airflow to be deflected;
wherein a first one of the deflector ribs includes an elongated portion extending between the heater and the evaporator, and a transverse portion extending perpendicular to the elongated portion, the transverse portion is at an end of the elongated portion proximate to the evaporator;
wherein the first one of the plurality of ribs is furthest from a base of the HVAC system;
wherein the first one of the plurality of ribs is closest to the heater; and
wherein the first one of the plurality of ribs is furthest form the evaporator.

16. The HVAC system of claim 15, wherein each one of the deflector ribs includes a first end proximate to the heater and a second end proximate to the evaporator, the second end is opposite to the first end.

* * * * *